United States Patent
Xing et al.

(10) Patent No.: US 12,099,258 B2
(45) Date of Patent: Sep. 24, 2024

(54) EDGE SEALANT APPLICATION FOR OPTICAL DEVICES

(71) Applicant: Magic Leap, Inc., Plantation, FL (US)

(72) Inventors: Wendong Xing, Plantation, FL (US); Neal Paul Ricks, Plantation, FL (US); Thomas Mercier, Weston, FL (US); William Hudson Welch, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 5 days.

(21) Appl. No.: 17/984,818

(22) Filed: Nov. 10, 2022

(65) Prior Publication Data

US 2023/0083319 A1 Mar. 16, 2023

Related U.S. Application Data

(62) Division of application No. 16/438,663, filed on Jun. 12, 2019, now Pat. No. 11,513,372.

(Continued)

(51) Int. Cl.
*G02C 13/00* (2006.01)
*B29C 35/02* (2006.01)
(Continued)

(52) U.S. Cl.
CPC ........ *G02C 13/001* (2013.01); *B29C 35/0288* (2013.01); *G02B 25/001* (2013.01);
(Continued)

(58) Field of Classification Search
CPC ........ B29D 11/00009; B29D 11/00413; B29D 11/00432; B29D 11/00865; G02C 13/001; G02C 13/005

See application file for complete search history.

(56) References Cited

U.S. PATENT DOCUMENTS 4,360,015 A  11/1982 Mayer
4,547,037 A  10/1985 Case
(Continued)

FOREIGN PATENT DOCUMENTS

CA  3013957  8/2017
CN  1426439  6/2003
(Continued)

OTHER PUBLICATIONS

CN Office Action in Chinese Application No. 201780051980.X, dated Nov. 20, 2020, 16 pages (with English translation).

(Continued)

*Primary Examiner* — Yunju Kim
(74) *Attorney, Agent, or Firm* — Fish & Richardson P.C.

(57) ABSTRACT

Techniques are described for applying an edge sealant to the edge of a multi-layer optical device. In particular, embodiments provide an apparatus that performs a precision measurement of the perimeter of an eyepiece, applying the edge sealant (e.g., polymer) based on the precision-measured perimeter, and subsequently cures the edge sealant, using ultraviolet (UV) light that is directed at the edge sealant. The curing process may be performed within a short time following the application of the edge sealant, to ensure that any wicking of the edge sealant between the layers of the eyepiece is controlled to be no greater than a particular depth tolerance. In some examples, the edge sealant is applied to the optical device prevent, or at least reduce, the leakage of light from the optical device, and also to ensure and maintain the structure of the multi-layer optical device.

10 Claims, 16 Drawing Sheets

Related U.S. Application Data

(60) Provisional application No. 62/683,980, filed on Jun. 12, 2018.

(51) Int. Cl.
  *B29C 35/08* (2006.01)
  *B29D 11/00* (2006.01)
  *G02B 25/00* (2006.01)

(52) U.S. Cl.
  CPC .... *G02C 13/005* (2013.01); *B29C 2035/0827* (2013.01); *B29D 11/00413* (2013.01)

(56) References Cited

U.S. PATENT DOCUMENTS

| | | |
|---|---|---|
| 4,723,953 A | 2/1988 | Rosenbaum et al. |
| 5,007,977 A | 4/1991 | Gottschald |
| 5,029,985 A | 7/1991 | Suzuki et al. |
| 5,210,630 A | 5/1993 | Heynderickx et al. |
| 5,547,747 A | 8/1996 | Trokhan et al. |
| 5,556,085 A | 9/1996 | Cyr |
| 5,931,755 A | 8/1999 | Mailey et al. |
| 6,165,547 A | 12/2000 | Leedom |
| 6,456,355 B1 | 9/2002 | Choi et al. |
| 6,547,940 B2 | 4/2003 | Aksay et al. |
| 6,972,788 B1 | 12/2005 | Robertson et al. |
| 7,081,940 B2 | 7/2006 | Suzuki |
| 7,713,436 B1 | 5/2010 | Trajkovska-Petkoska et al. |
| 7,718,124 B2 | 5/2010 | Simmet |
| 8,042,280 B2 | 10/2011 | Watanabe et al. |
| 8,083,349 B2 | 12/2011 | Ho et al. |
| 8,357,312 B2 | 1/2013 | Sun |
| 10,241,260 B2 | 3/2019 | Miller et al. |
| 11,022,748 B2 | 6/2021 | Miller et al. |
| 11,198,233 B2 | 12/2021 | Bhagat et al. |
| 2002/0154264 A1 | 10/2002 | Suzuki |
| 2002/0181128 A1 | 12/2002 | Beattie et al. |
| 2003/0220059 A1 | 11/2003 | Yamasaki |
| 2004/0057683 A1 | 3/2004 | Shimizu et al. |
| 2005/0155704 A1 | 7/2005 | Yokajty et al. |
| 2005/0237615 A1 | 10/2005 | Urey et al. |
| 2006/0204205 A1 | 9/2006 | Hayashi |
| 2006/0215244 A1 | 9/2006 | Yosha et al. |
| 2006/0239169 A1 | 10/2006 | Marumo et al. |
| 2007/0082288 A1 | 4/2007 | Wright et al. |
| 2007/0103747 A1 | 5/2007 | Powell et al. |
| 2007/0207560 A1 | 9/2007 | LeCain et al. |
| 2007/0258691 A1 | 11/2007 | Charters et al. |
| 2008/0308971 A1 | 12/2008 | Liu et al. |
| 2009/0053850 A1 | 2/2009 | Nishida et al. |
| 2009/0256977 A1 | 10/2009 | Haddock et al. |
| 2010/0202731 A1 | 8/2010 | Mitsumori |
| 2011/0024862 A1 | 2/2011 | Tu et al. |
| 2011/0026039 A1 | 2/2011 | Nimmakayala et al. |
| 2011/0207328 A1 | 8/2011 | Speakman |
| 2012/0013969 A1 | 1/2012 | Wang et al. |
| 2012/0212414 A1 | 8/2012 | Osterhout et al. |
| 2012/0224276 A1 | 9/2012 | Lin et al. |
| 2013/0174333 A1 | 7/2013 | Schwartz |
| 2015/0023643 A1 | 1/2015 | Chartoff et al. |
| 2015/0070602 A1 | 3/2015 | Fujita |
| 2015/0158240 A1 | 6/2015 | Haase et al. |
| 2015/0168646 A1 | 6/2015 | Arai |
| 2015/0277126 A1 | 10/2015 | Hirano et al. |
| 2016/0116739 A1 | 4/2016 | TeKolste et al. |
| 2016/0318213 A1 | 11/2016 | Benson, Jr. |
| 2017/0191754 A1 | 7/2017 | Jing et al. |
| 2017/0276944 A1 | 9/2017 | Kim et al. |
| 2017/0299810 A1 | 10/2017 | Brouwer et al. |
| 2018/0052276 A1 | 2/2018 | Klienman et al. |
| 2018/0059320 A1 | 3/2018 | Miller et al. |
| 2018/0120198 A1 | 5/2018 | Glasenapp et al. |
| 2018/0250670 A1 | 9/2018 | Le Berre et al. |
| 2019/0111642 A1 | 4/2019 | Chang et al. |
| 2019/0170932 A1 | 6/2019 | Miller et al. |
| 2021/0311298 A1 | 10/2021 | Xing et al. |

FOREIGN PATENT DOCUMENTS

| | | |
|---|---|---|
| CN | 101589326 | 11/2009 |
| CN | 102236208 A | 11/2011 |
| CN | 102365567 | 2/2012 |
| CN | 102928981 | 2/2013 |
| CN | 103869526 A | 6/2014 |
| CN | 204084009 U | 1/2015 |
| CN | 104950442 A | 9/2015 |
| CN | 105161506 A | 12/2015 |
| JP | H02-143201 | 6/1990 |
| JP | H11-281837 | 10/1999 |
| JP | 2002-328377 A | 11/2002 |
| JP | 2003-255207 | 9/2003 |
| JP | 2004031939 A | 1/2004 |
| JP | 2004272012 A | 9/2004 |
| JP | 2005231960 A | 9/2005 |
| JP | 2007-233303 A | 9/2007 |
| JP | 2009-282488 | 12/2009 |
| JP | 2012058683 A | 3/2012 |
| JP | 2013-190715 | 9/2013 |
| JP | 2014-209060 | 11/2014 |
| JP | 2015-093399 | 5/2015 |
| JP | 2016107524 A | 6/2016 |
| JP | 2018506068 A | 3/2018 |
| JP | 2020511795 A | 4/2020 |
| KR | 20050069214 A | 7/2005 |
| KR | 10-2016-0097286 A | 8/2016 |
| WO | WO 2015089158 | 6/2015 |
| WO | WO 2015128408 | 9/2015 |
| WO | WO 2016020643 | 2/2016 |
| WO | WO 2016054092 | 4/2016 |

OTHER PUBLICATIONS

EP Extended European Search Report in European Application No. EP17844429, dated Aug. 8, 2019, 7 pages.
EP Extended Search Report in European Appln. No. 19842348.5, dated Jul. 26, 2021, 8 pages.
Extended European Search Report in European Appln. No. 19873527.6, dated Dec. 14, 2021, 14 pages.
JP Office Action in Japanese Appln. No. 2019-510780, dated Aug. 2, 2021, 26 pages (with English translation).
KR Office Action in Korean Application No. 10-2019-7008606, dated Dec. 3, 2020, 7 pages (with English translation).
Office Action in Chinese Appln. No. 201980082625.8, dated Feb. 11, 2022, 12 pages (with English translation).
PCT International Search Report and Written Opinion for International Appln. No. PCT/US2017/048442, dated Nov. 16, 2017, 14 pages.
PCT International Search Report and Written Opinion in International Appln. No. PCT/US2019/036782, mailed Sep. 5, 2019, 8 pages.
PCT International Search Report and Written Opinion in International Appln. No. PCT/US2019/042804, dated Oct. 10, 2019, 8 pages.
PCT International Search Report and Written Opinion in International Appln. No. PCT/US2019/056519, dated Jan. 10, 2020, 13 pages.
Office Action in Japanese Appln. No. 2021-503589, dated Apr. 4, 2023, 10 pages (with English translation).
Extended European Search Report in European Appln. No. 23190027.5, dated Oct. 2, 2023, 8 pages.
Notice of Allowance in Chinese Appln. No. 202210366992.4, dated Nov. 24, 2023, 7 pages (with English translation).
Notice of Allowance in Japanese Appln. No. 2022-198424, dated Dec. 26, 2023, 5 pages (with English translation).
Notice of Allowance in Japanese Appln. No. 2021-520948, dated Nov. 28, 2022, 5 pages (with English translation).

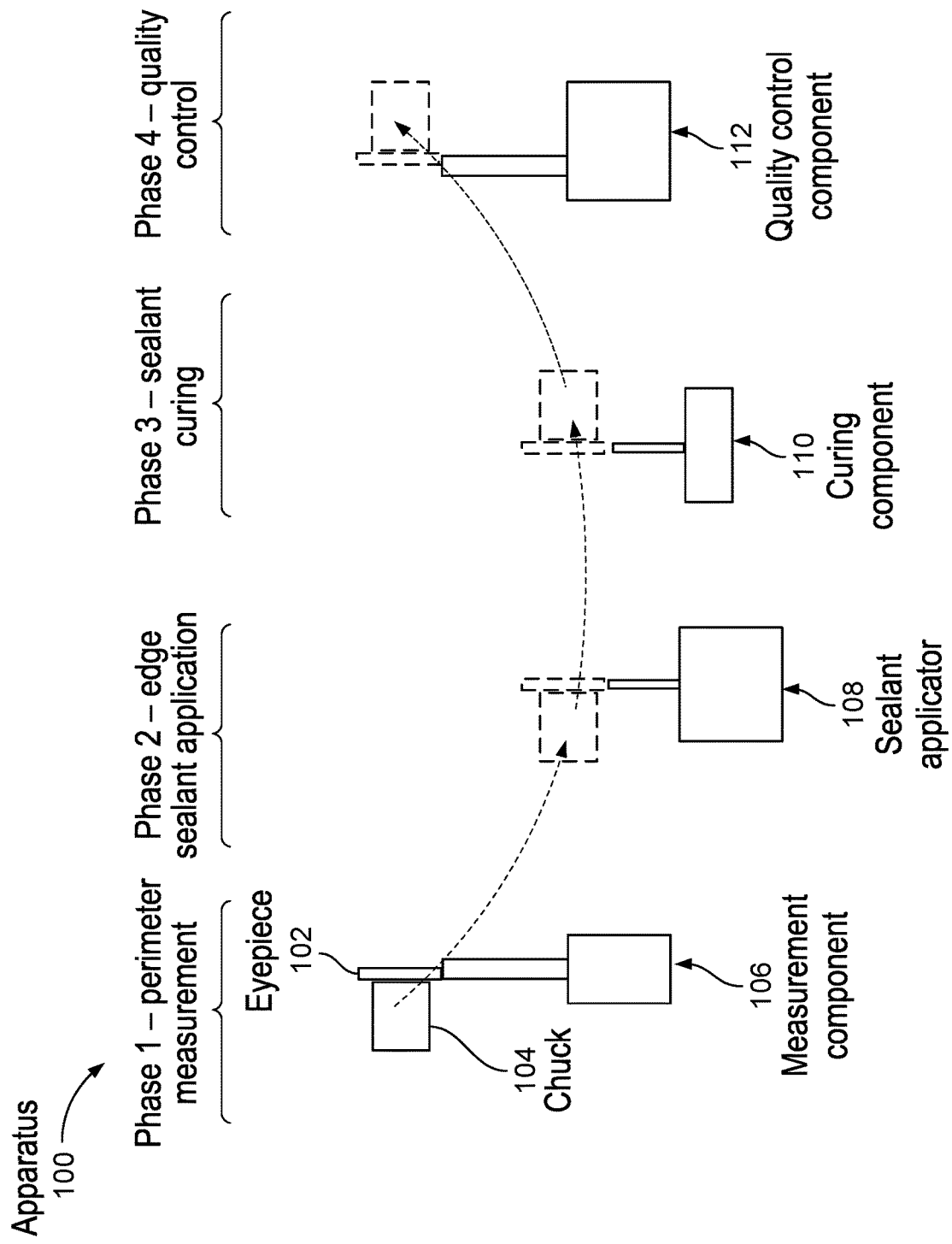

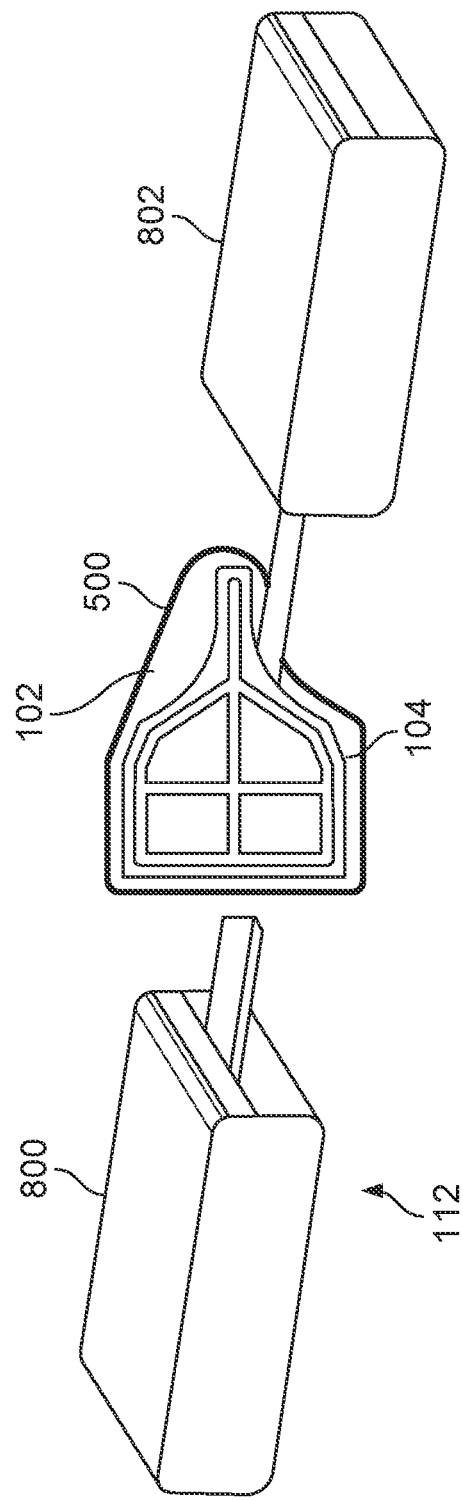

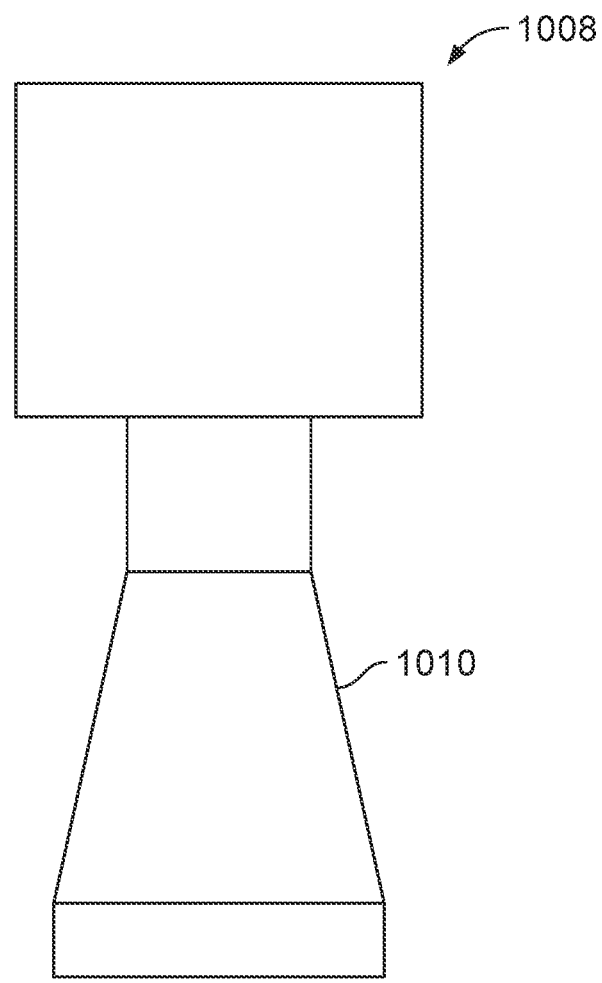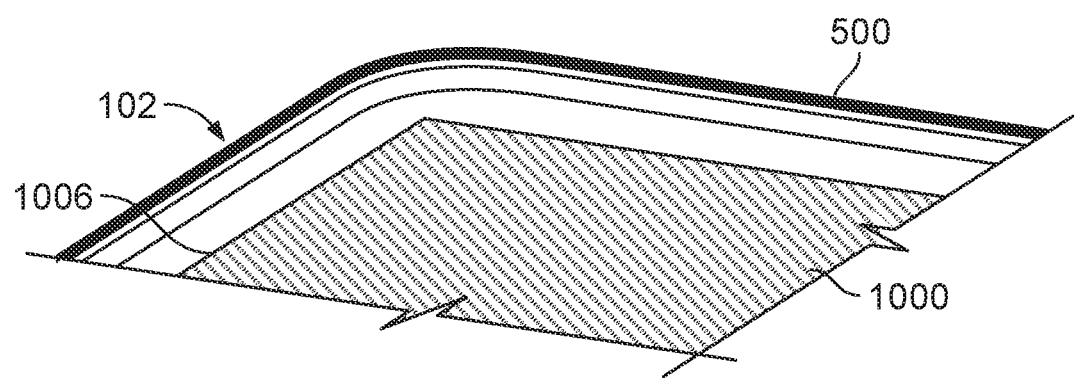
FIG. 10B

EDGE SEALANT APPLICATION FOR OPTICAL DEVICES

CROSS-REFERENCE TO RELATED APPLICATIONS

This application is a divisional of U.S. application Ser. No. 16/438,663 entitled "EDGE SEALANT APPLICATION FOR OPTICAL DEVICES," which claims the benefit of U.S. Application No. 62/683,980 entitled "EDGE SEALANT APPLICATION FOR OPTICAL DEVICES" and filed on Jun. 12, 2018, which are incorporated by reference herein in their entirety.

BACKGROUND

In optical devices, light can be directed and/or manipulated to achieve a desired effect. For example, in an optical device such as an eyepiece used in a virtual reality interface, visible light can be directed and/or manipulated to provide image data that is perceived by a user. Various types of optical devices may be subjected to testing, during and/or after manufacture, to ensure that the devices are manufactured and/or operate according to desired specifications. For example, in some types of optical devices, it may be advantageous to reduce or eliminate the leakage of light out of the device.

SUMMARY

Embodiments of the present disclosure are generally directed to techniques for applying an edge sealant to optical devices. More specifically, embodiments are directed to at least one apparatus and/or at least one method for measuring a perimeter of an eyepiece that includes multiple layers, applying edge sealant to the eyepiece based on the measured perimeter, and curing the edge sealant in a manner that controls the wicking of the edge sealant between the layers of the eyepiece.

In general, innovative aspects of the subject matter described in this specification can be embodied as an apparatus for applying an edge sealant to an eyepiece, the apparatus including: a chuck that secures the eyepiece to rotate with the chuck while the chuck rotates, the eyepiece comprising multiple optics layers; a perimeter measurement component including a bearing mechanism comprising a bearing and a spring that allows the bearing to move in a transverse direction while the bearing is rotating, and that causes the bearing to maintain contact with an edge of the eyepiece while the eyepiece is rotating during a first operational phase to generate a perimeter measurement of a perimeter of the eyepiece, and a recording component that generates and stores the perimeter measurement of the perimeter of the eyepiece during the first operational phase, the perimeter measurement being based on detected movement of the bearing in the transverse direction while the bearing is rotating and in contact with the edge of the eyepiece while the eyepiece is rotating; a sealant applicator that applies the edge sealant to the edge of the eyepiece according to the perimeter measurement while the eyepiece is rotating, during a second operational phase, wherein the sealant applicator applies the edge sealant to the multiple optics layers of the eyepiece during a single sealant application operation; and a curing component that cures the edge sealant during a third operational phase.

Embodiments can optionally include one or more of the following features.

In some embodiments, the rotating chuck applies at least a partial vacuum to one side of the eyepiece to secure the eyepiece against the rotating chuck.

In some embodiments, an outer surface of the bearing, which is in contact with the edge of the eyepiece during generation of the perimeter measurement, is composed of a plastic.

In some embodiments, the curing components includes multiple ultraviolet (UV) light sources that direct UV light toward the edge sealant during the third operational phase.

In some embodiments, the multiple UV light sources include at least two UV light sources directed to the edge of the eyepiece and at least one UV light source that is directed in perpendicularly to the edge of the eyepiece. That is, at least one UV light source provides radiation directed substantially parallel to a plane defined by the edge of the eyepiece and at least one UV light source provides radiation substantially perpendicular to the plane defined by the edge of the eyepiece.

In some embodiments, the third operational phase is performed within a maximum threshold period of time following completion of the second operational phase, to prevent the edge sealant from wicking, between the multiple optics layers of the eyepiece, farther than a maximum tolerance depth.

In some embodiments, the curing component cures the edge sealant during the third operational phase according to the perimeter measurement while the rotating chuck is rotating with the secured eyepiece.

In some embodiments, the apparatus further includes a quality control (QC) component that performs in-line QC of the eyepiece, the QC component including a laser micrometer to measure thickness of the eyepiece and a vision camera to measure edge band thickness and wicking length of the edge sealant.

In some embodiments, the eyepiece is a left eyepiece, the left eyepiece has a common area with a right eyepiece, and the chuck is configured to secure the left eyepiece and the right eyepiece within the common area.

In some embodiments, the sealant applicator is configured to apply the edge sealant to the edge of the eyepiece such that a thickness of the applied edge sealant in the plane of the eyepiece is in a range between about 80 microns and about 250 microns.

In general, innovative aspects of the subject matter described in this specification can be embodied as a method for applying an edge sealant to an eyepiece, the method including securing the eyepiece having multiple optics layers to a chuck such that a surface of the eyepiece is in contact with the chuck; rotating the chuck, wherein the eyepiece rotates with the chuck while the chuck rotates; measuring a perimeter around an edge of the eyepiece to yield a perimeter measurement; applying, while the eyepiece is rotating and according to the perimeter measurement, a sealant to the edge of the eyepiece; and curing the sealant.

Embodiments can optionally include one or more of the following features.

In some embodiments, measuring the perimeter around the edge of the eyepiece comprises contacting the edge of the eyepiece with a bearing while the eyepiece is rotating, thereby rotating the bearing. The bearing can be coupled to a spring that allows movement of the bearing, while the bearing is contacting the edge of the eyepiece, in a direction substantially parallel to a plane defined by the surface of the eyepiece in contact with the chuck. The perimeter measurement is based at least in part on detected movement of the bearing in the direction substantially parallel to the plane defined by the surface of the eyepiece in contact with the chuck.

In some embodiments, the method includes storing the perimeter measurement.

In some embodiments, securing the eyepiece to the chuck includes applying at least a partial vacuum to the surface of the eyepiece.

In some embodiments, applying the sealant to the edge of the eyepiece includes applying the sealant to the multiple optics layers.

In some embodiments, applying the sealant to the edge of the eyepiece includes applying a single layer of the sealant to the entire perimeter.

In some embodiments, curing the sealant comprises irradiating the sealant with UV radiation. Irradiating the sealant with UV radiation comprises irradiating the sealant with UV radiation directed along or substantially parallel to a plane defined by the edge of the eyepiece, along or substantially parallel to a plane defined by the surface of the eyepiece, or both.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF DRAWINGS

FIG. 1 depicts a schematic of an example apparatus, according to embodiments of the present disclosure.

FIG. 8 depicts an example quality control component included in the apparatus, according to embodiments of the present disclosure.

FIG. 10B depicts an example arrangement for imaging the eyepiece, according to embodiments of the present disclosure.

DETAILED DESCRIPTION

Figure 2A:
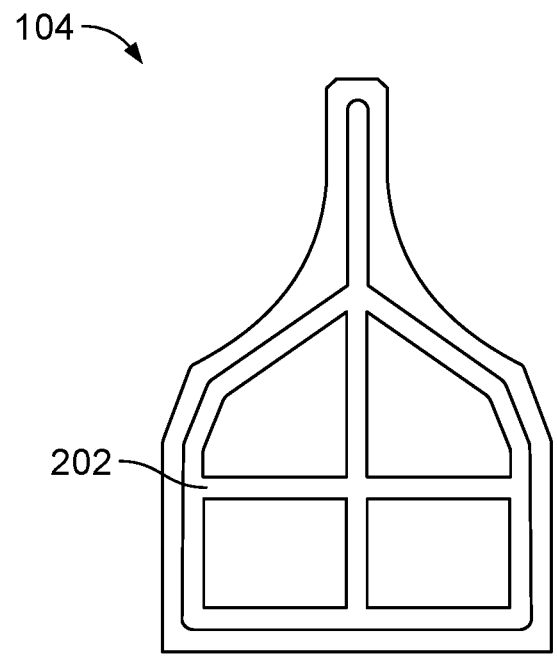
FIG. 2A depicts a schematic of an example chuck included in the apparatus, according to embodiments of the present disclosure.

Embodiments of the present disclosure are directed to techniques for applying an edge sealant to the edge of a multi-layer optical device. In particular, embodiments provide an apparatus that performs a precision measurement of the perimeter of an eyepiece, applying the edge sealant (e.g., polymer) based on the precision-measured perimeter, and subsequently cures the edge sealant, using ultraviolet (UV) light that is directed at the edge sealant. The curing process may be performed (e.g., immediately) following the application of the edge sealant, to ensure that any wicking of the edge sealant between the layers of the eyepiece is controlled to be no greater than a particular depth tolerance. In some examples, the edge sealant is applied to the optical device to prevent, or at least reduce, the leakage of light from the optical device, and also to ensure and maintain the structure of the multi-layer optical device. In some examples, the optical device being inspected is an eyepiece that has been manufactured for use in a virtual reality, augmented reality, and/or computer vision interface device, and/or to deliver image data, video data, graphics data, and/or other types of visually perceivable information to a user who is wearing or otherwise using the interface device.

In some examples, manufacture of an eyepiece can include the application of a polymer sealant, or other type of sealant, around the edge(s) of the eyepiece. The sealant may accordingly be described as an edge sealant. The sealant may be applied to absorb light coming out of the eyepiece, and to prevent light from reflecting back into the eyepiece and degrading its optical performance. In experiments conducted on an example eyepiece, when sealant is applied in a faulty manner with gaps, flaws, or inconsistencies, tests showed that the eyepiece exhibited optical defects such as degraded contrast. To ensure the quality and performance of the eyepiece, the apparatus described herein can be used to precisely apply the edge sealant according to the particular variations along the perimeter of an eyepiece, and cure the sealant promptly after its application to control the wicking of the sealant between the layers of the eyepiece.

FIG. 1 depicts a schematic of an example apparatus 100, according to embodiments of the present disclosure. As shown in the example of FIG. 1, the apparatus 100 can include various components to perform different operations during different phases of a multi-phase process. The apparatus 100 can include a chuck 104 that is configured to secure an eyepiece 102 during one or more of the phases. The eyepiece 102 can be placed on the chuck 104 prior to starting the process. In some embodiments, the chuck 104 includes a mechanism that provides at least a partial vacuum on one side of the eyepiece 102, to secure the eyepiece 102 to the chuck 104. The chuck 104 can also therefore be described as a vacuum chuck. In some embodiments, the vacuum applied is −77±3 kPa. Embodiments also support other suitable structures and/or mechanisms that can secure the eyepiece to the chuck 104.

In some embodiments, the eyepieces may be either left or right eyepieces, which are substantially inverted relative to each other. The left and right eyepieces can be later assembled to create a wearable. The chuck 104 can be configured to accommodate the shape of both the left and right eyepieces, such that the same chuck 104 can be used for processing either left or right eyepieces. Various components of the apparatus 100 can detect whether a left or right eyepiece is in the chuck 104, and the operations of the components can be adjusted accordingly. For example, the eyepiece 102 can include a barcode or other information that records the left or right configuration of the eyepiece, and the barcode (or other information) can be scanned by a scanner of the apparatus during processing of the eyepiece, to determine particular component movements during perimeter measurement, sealant application, curing, and/or quality control (QC). In some embodiments, one eyepiece at a time (e.g., left or right) can be placed in the chuck 104 and can undergo the process for measurement, sealant application, curing, and/or QC, as described further below.

The chuck 104 may be configured to rotate while the eyepiece 102 is secured to the chuck 104, and the eyepiece 102 can rotate with the chuck 104. During a first phase, a measurement component 106 can be used to generate a measurement of the perimeter of the eyepiece 102 as it rotates. The measurement component can include a bearing mechanism, which itself includes a rotating bearing and a spring (or other suitable mechanism) that allows the bearing to move in a transverse direction while the bearing is rotating. The spring (or other suitable mechanism) can be arranged to ensure that the bearing maintains contact with the edge of the eyepiece, along the entire perimeter of the eyepiece, while the rotating chuck 104 is rotating. The measurement component can also include a recording component that generates the perimeter measurement of the perimeter of the eyepiece (e.g., a length of the perimeter) based on the detected movement of the bearing in the transverse direction while the bearing is rotating and in contact with the edge of the eyepiece. Thus, the rotating bearing can track along the perimeter of the eyepiece while the eyepiece is rotating as well, and the recording component can use the transverse movement of the bearing to effectively map the perimeter of the eyepiece with high precision, to measure any (e.g., small) inconsistency in the expected dimensions of the various eyepieces that are manufactured. Thus, this mapping process can also be described as determining the perimeter error of the eyepiece.

In some embodiments, at least an outer portion of the bearing is composed of a plastic or other suitable material, e.g., where the bearing is in contact with the edge of the eyepiece, to prevent micro-cracks or other damage to the eyepiece during its rotation. For example, the bearing may be composed at least partially of polyether ether ketone (PEEK) or some other suitable polymer. Use of other edge perimeter measurement techniques can also be used in some embodiments. For example, a laser micrometer can be used to measure the perimeter of the eyepiece to high precision, without the measurement mechanism contacting the eyepiece edge.

The perimeter measurement data for a particular eyepiece can be generated and, in some examples, stored in a suitable computer memory storage module, during the first phase. The perimeter measurement data can then be used during one or more subsequent phases of the process. For example, in a second phase, the perimeter measurement information can be used to apply the edge sealant to the edge of the eyepiece. A sealant applicator 108 can be used to apply the sealant. The measurement information can be employed to direct the sealant applicator, to determine where to place the applicator mechanism relative to the edge of the eyepiece as the eyepiece is again being rotated by the chuck 104. For example, the measurement information can be used to ensure that the applicator is kept at a substantially constant distance from the edge of the eyepiece as it is be rotated, to ensure consistent application of the sealant along the entire perimeter of the eyepiece. In some embodiments, the sealant applicator can also rotate as well, and this applicator (also described as a polymer wheel) can be positioned to maintain a substantially constant distance between eyepiece and polymer wheel during sealant application to achieve a substantially uniform coating.

The sealant can be applied to an entire edge of the eyepiece during a single process, with application across the entire thickness of the eyepiece, across all the layers of the multi-layer eyepiece. Once the sealant is applied to the multi-layer structure, the sealant begins wicking between the layers of the eyepiece. Accordingly, a third phase for curing the sealant can be initiated shortly following (e.g., immediately following) the completion of the sealant application. In some embodiments, the curing can be started within a threshold maximum time duration following completion of the sealant application. For example, the curing can begin as soon as possible given the design of the apparatus and its various components. Various factors can contribute to the amount of wicking that occurs (e.g., the wicking length), including: the particular material used for the sealant, and its viscosity; the delay before curing begins; and/or incoming material variation such as the air gap size between the layers in the eyepiece. For example, the smaller the gap, the more wicking may occur due to capillary effect. In some embodiments, the curing and sealant application motion and/or speed can be consistent so that all parts of the sealant (e.g., all portions of the edge) may have the same or substantially the same wicking time. Additionally, the contour measuring motion and/or speed can also be kept the same as the sealant application, to provide a better point-to-point feedback to adjust the sealant applicator position during sealing.

During the third phase, a curing component 110 is used to cure the sealant that was applied during the second phase. In some embodiments, the perimeter measurement information can be employed to maintain the curing component 110 at a consistent distance from the edge of the eyepiece to ensure consistent curing along the entire perimeter. For example, the applicator can be moved in a transverse direction according to the perimeter measurement information to maintain a substantially consistent distance between the applicator and the edge of the eyepiece along the entire perimeter of the eyepiece. Alternatively, the perimeter measurement information may not be employed during curing, and the curing component 110 can be maintained at a location to provide a sufficiently consistent distance from the edge of the eyepiece, based on a default or as-designed perimeter configuration of the eyepiece (e.g., and not account for perimeter error during manufacture). By curing the sealant soon after its application, embodiments can minimize the wicking of the sealant between layers of the eyepiece, or ensure that the wicking is to a depth that is consistent for different eyepieces.

In some embodiments, one or more UV light sources (probes) can be employed to cure the sealant. Each UV probe can emit UV light in an appropriate range of wavelengths to cure the sealant. The sealant can be a black UV-sensitive polymer that cures when exposed to UV light for a period of time. Use of the sealant can enhance the optical performance of the eyepieces with respect to brightness and/or contrast, while also providing mechanical strength and structural integrity to the multi-layer structure of the eyepiece.

In some embodiments, the curing component 110 can include multiple UV probes that each emits UV light directed at the sealant. In some embodiments, the probes can be set to emit UV light at different wavelengths to provide an optimal, combined curing effect for the sealant. For example, the probes can be set to emit UV light at 365, 385, and 405 nanometers (nm) respectively. The particular wavelength(s) of the probe(s) can be based on the particular polymer being used in the sealant, and the desired curing speed (and wicking depth). The multiple probes can be placed at different positions relative to the eyepiece edge, to achieve efficient curing. For example, one or more probes may be placed to direct UV light toward the edge, within some probe(s) at a 90 degree angle to the broad surface of the eyepiece, and some probe(s) at a 0 degree angle relative to the broad surface. Other positions can also be employed.

After application of the sealant, the wicking can begin fairly quickly. Accordingly, embodiments can employ multiple probes to cure the sealant as fast as possible to limit the wicking, and the curing can also begin as soon as possible after sealant application. In some embodiments, two or four probes are used pointing in different directions (e.g., from the side, top, and/or bottom of the eyepiece) to project UV light into the glass between the layers of the eyepiece toward the sealant. Control of wicking may be critical to ensure proper performance of the eyepiece, given the use of a black sealant as described herein. In some embodiments, the maximum allowed wicking length is 1.5 mm before touching the grating of the eyepiece. The curing speed can be set to target a desired wicking length (e.g., 0.35 mm). The focus length of the probe(s) can be set to be 10 mm, corresponding to the 10 mm focus lens used on the UV probe(s). The UV probe(s) can be arranged such that each probe lens is 10 mm away from the eyepiece. The probe time (e.g., duration of emitted UV light) can also be adjusted.

In some embodiments, the process can include a fourth phase for QC. During this phase, one or more QC components 112 can operate to perform various test(s) and/or measurement(s) on the eyepiece to ensure its quality and detect any problems. For example, a laser micrometer and/or vision camera or other suitable device, or other metrology techniques, can be used to measure the eyepiece thickness, the thickness of the edge sealant, the sealant wicking length, and/or the position of the eyepiece grating boundary, also described as the EPE grating boundary. Such inspection can determine whether there is sufficient edge sealant applied along the perimeter of the eyepiece. The QC can be performed in-line, during the same process and using the same apparatus 100, as the measurement, sealant application, and curing steps. In some embodiments, the in-line QC results can be fed back to sealant application actively for process control.

Although FIG. 1 illustrates embodiments in which the components 106, 108, 110, and 112 are part of the same apparatus 100, embodiments are not so limited. In some embodiments, one or more components may be part of a separate apparatus. Moreover, FIG. 1 illustrates examples in which the eyepiece is processed during the four phases while secured to the chuck 104. In some embodiments, one or more phases can include removing the eyepiece from the chuck and performing operations separately. For example, at least some QC can be performed after the eyepiece is removed from the chuck.

Figure 2B:
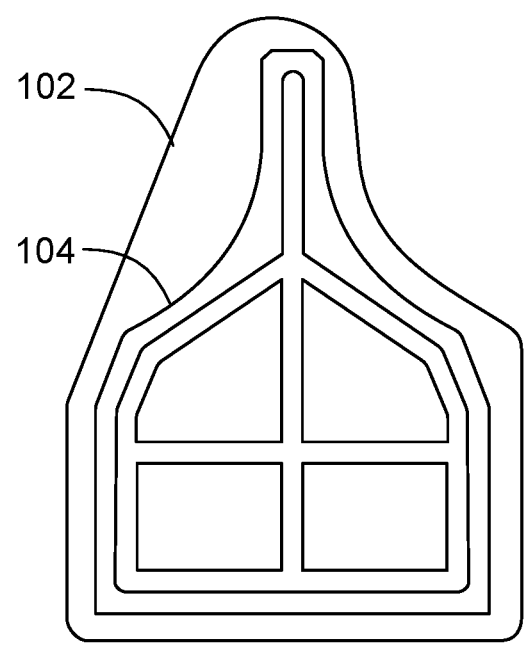
FIG. 2B depicts the example chuck aligned with an eyepiece.

FIG. 2A depicts a schematic of an example chuck 104 included in the apparatus 100, according to embodiments of the present disclosure. FIG. 2A is an example image of a chuck 104 that may be employed. As shown, the chuck 104 can include one or more vacuum grooves 202 to apply at least a partial vacuum to a side of the eyepiece, to secure the eyepiece to the chuck 104 during one or more of the phases of the process. FIG. 2B is an example image of an eyepiece 102 secured to the chuck 104.

Figure 2C:
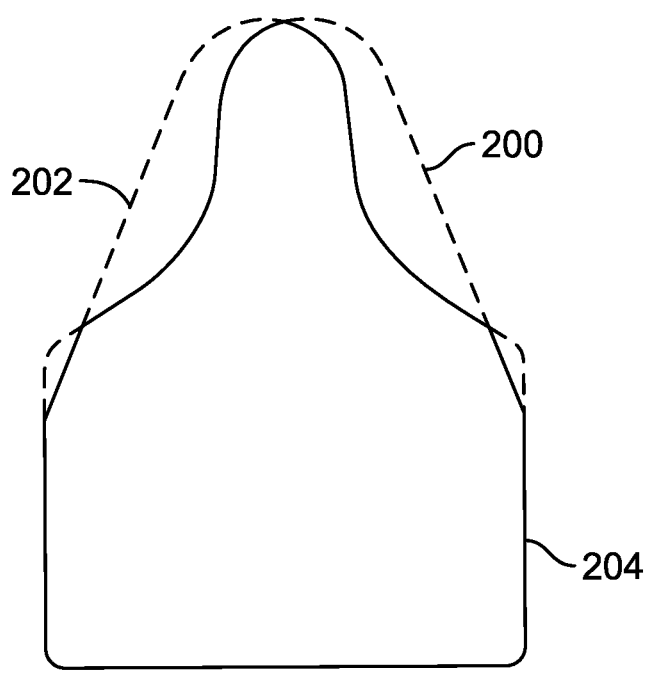
FIG. 2C depicts two eyepieces in alignment and a common eyepiece area.
Figure 2D:
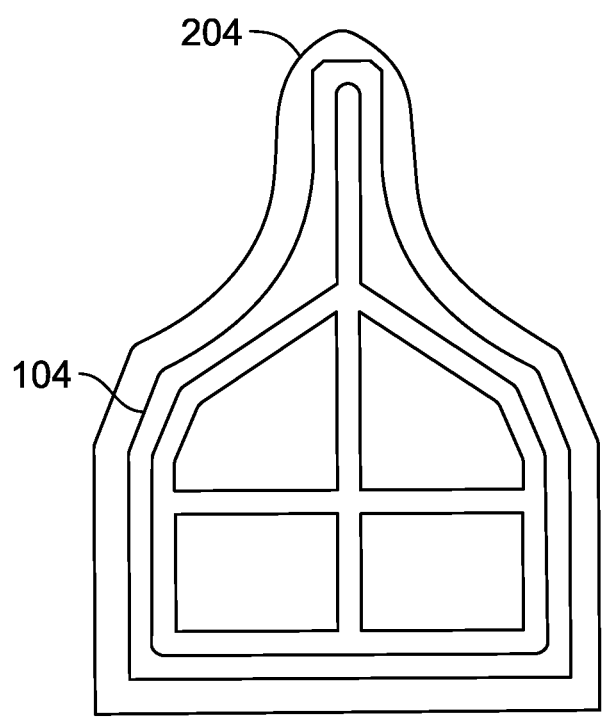
FIG. 2D depicts the example chuck aligned with the common eyepiece area of FIG. 2C.

FIG. 2C depicts a left eyepiece 200 and a right eyepiece 202 superimposed upon each other, and the resulting eyepiece common area 204. FIG. 2D illustrate an example schematic of the chuck 104 superimposed upon the eyepiece common area 204. As described above, the chuck 104 can be configured to accommodate either a left or right eyepiece. Although they are placed in different orientations with respect to the chuck, both the left and right eyepieces fully cover the vacuum chuck surface such that there is no (or minimal) vacuum leak, and such that the eyepiece, and not the edge of the vacuum chuck, is in contact with the measuring and polymer-application bearings.

Figure 3:
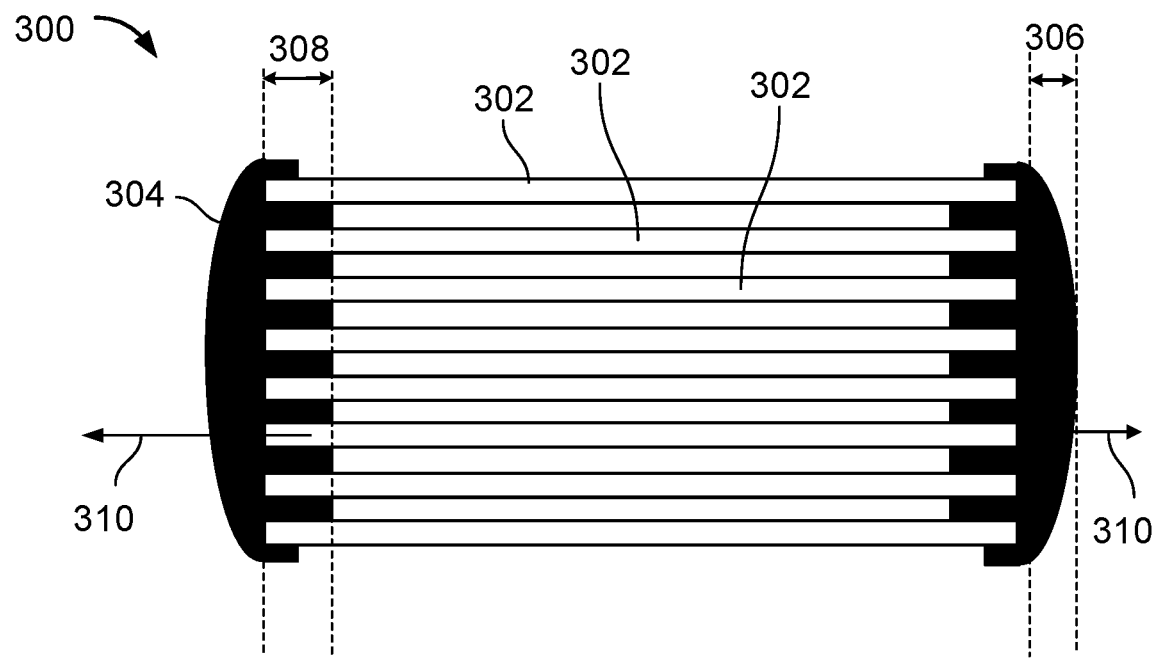
FIG. 3 depicts a cross-section schematic of an example optical device that can be inspected using the inspection apparatus, according to embodiments of the present disclosure.

FIG. 3 depicts a cross-section schematic 300 of an example optical device (e.g., eyepiece) that can be inspected using the inspection apparatus 100, according to embodiments of the present disclosure. The view shown is of a cross-section of an example eyepiece. As shown, the eyepiece can include multiple layers 302 that each provide a waveguide for a particular wavelength band of light. For example, different layers may be designed to guide red, green, or blue light. An edge sealant 304 may be applied to the edge of the eyepiece as shown, to attempt to prevent light leakage 310 from the interior to the exterior of the eyepiece in a transverse direction through the edge. The edge sealant 304 may also prevent reflection of light back into the interior of the eyepiece. The edge sealant 304 may be applied with an appropriate thickness 306, and may penetrate (through wicking) into the eyepiece, between the layers 302, to an appropriate depth 308. The eyepiece may be composed of multiple layers of (e.g., high index) glass in a stack. In some embodiments, the pressure applied by the sealant applicator can be set to achieve a desired thickness of the applied sealant.

The apparatus described herein can be used to apply edge sealant to any suitable type of optical device. In some examples, the eyepiece may be created at least in part using Jet and Flash Imprint Technology (J-FIL™), developed by Molecular Imprints™. The J-FIL technique may be used to create diffraction gratings on the layers of the glass of the eyepiece to create waveguide displays. Each layer may be a thin layer of glass with polymer gratings created on its surface using J-FIL. The diffraction gratings may provide the basic working functionality of the eyepiece. Once the diffraction gratings are formed onto a large, broad glass layer, the glass layer may be laser cut into the shape of the eyepiece. Each layer of glass may be a different color, and there may be multiple depth planes. A larger number of planes may provide for a better virtual experience for a user using the eyepiece. The layers may be stacked using the sealant polymer (e.g., glue dots or line), and the whole stack may be sealed using the sealant. Air gaps between the layers may be preserved for the optical performance of the eyepiece. The gaps between the layers may have controlled dimensions (e.g., substantially uniform width). The edge sealant polymer may be applied around the edge of the layered structure to seal the stack and air gaps from the outside environment. The edge seal glue also provides a physical lock to ensure mechanical integrity of the structure, while keeping out contamination and moisture. Without such a seal, the layers may fall apart and delaminate from one another. The gap between layers may be of any suitable width to achieve the desired optical functionality.

The use of the sealant enables creation of high contrast eyepieces by absorbing stray light that hits the edges of the eyepiece layers. The sealant also provides structural integrity for (e.g., "locks in") the mechanical gap and co-planarity of the eyepieces. The eyepiece may have any suitable number of layers 302 of glass or other material, and each layer may act as a waveguide to allow the passage of various frequencies of light. Layers may be configured for particular wavelengths, so as to propagate light of a particular color, and the eyepiece may be configured for a particular optical power, to create a number of depth planes at which light through the waveguide may be perceived. For example, a first set of waveguide layers may include layers for red, green, and blue at a first depth plane, and a second set of waveguide layers may include a second set of layers for red, green, and blue light corresponding to a second depth plane. The order of the colors may be arranged differently in different depth planes to achieve the desired optical effects in the eyepiece. In some embodiments, a single (e.g., blue) layer may cover multiple depth planes. In some examples, the edge sealant may be a glue, resin, polymer sealant, ink, and/or other viscous material. The edge sealant may be black. Blackening an edge of the multi-layer eyepiece may cause the absorption of light impinging on the edge, and/or provide for reduced reflection of light impinging on the edge.

Figure 4:
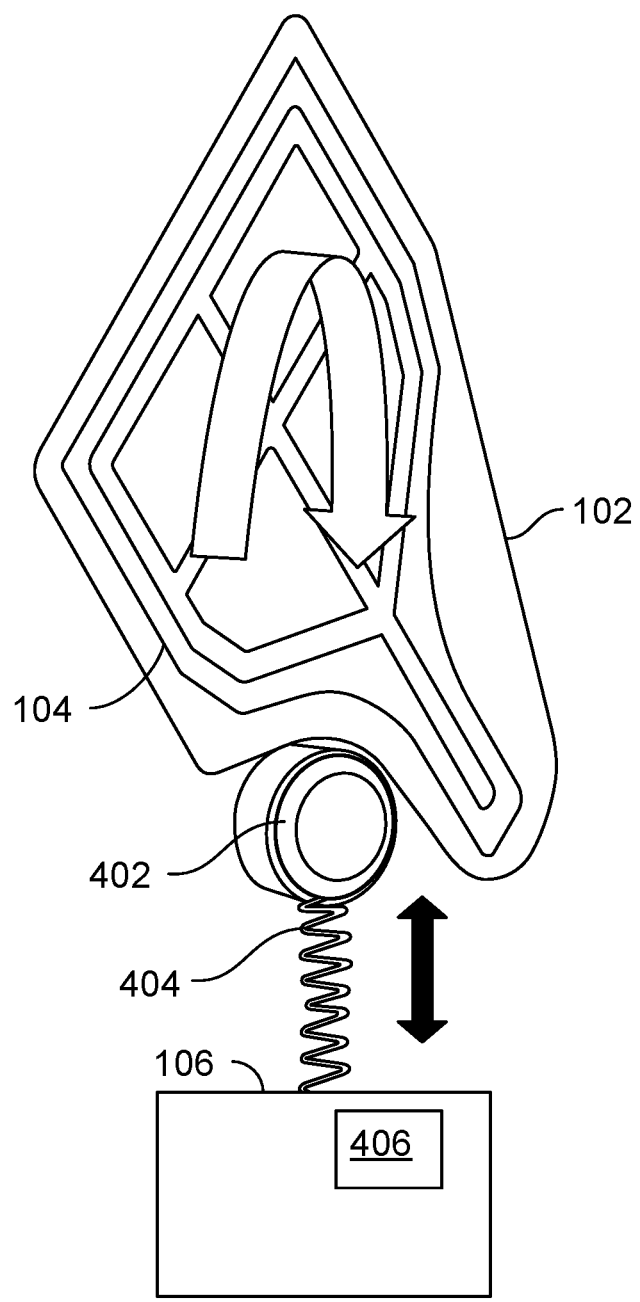
FIG. 4 depicts an example measurement component included in the apparatus, according to embodiments of the present disclosure.
Figure 5A:
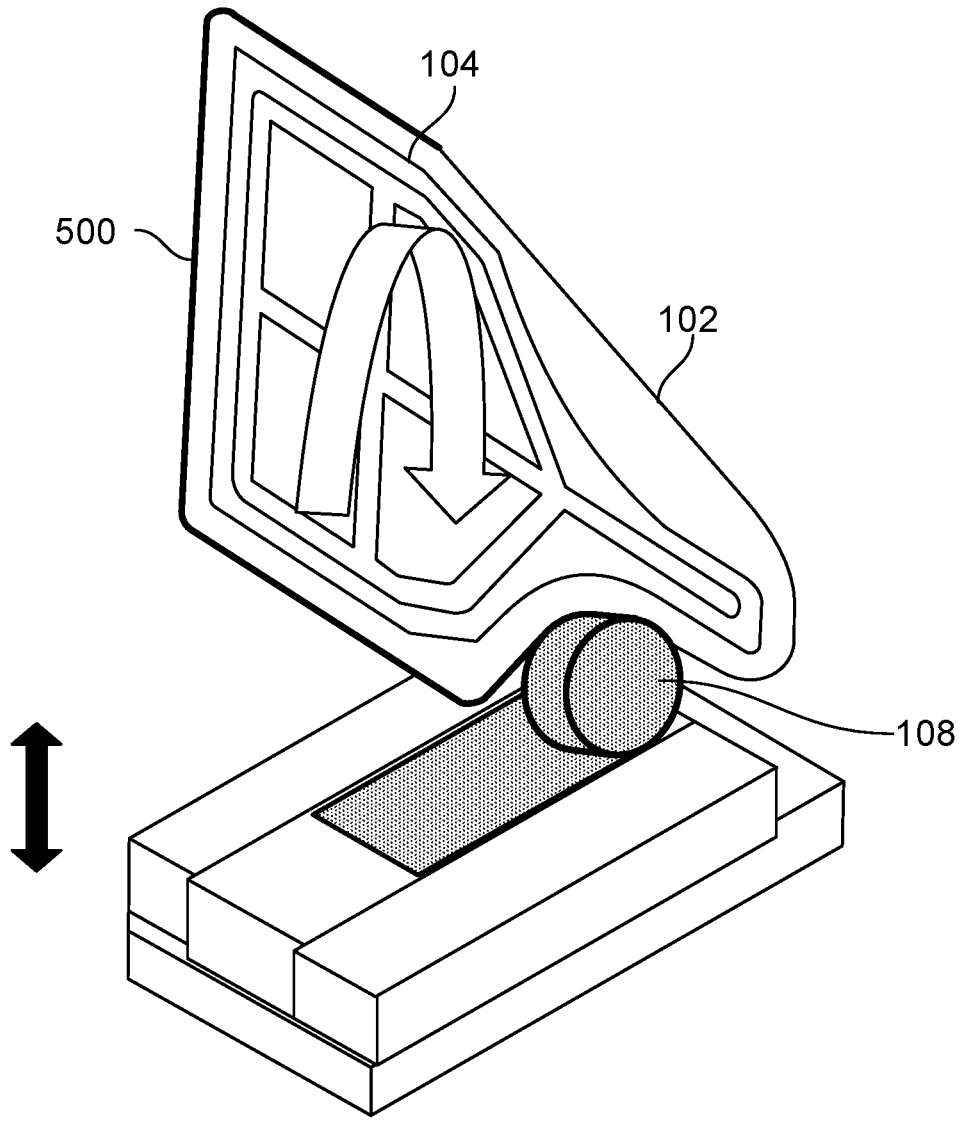
FIGS. 5A and 5B depict an example sealant applicator included in the apparatus, according to embodiments of the present disclosure.
Figure 5B:
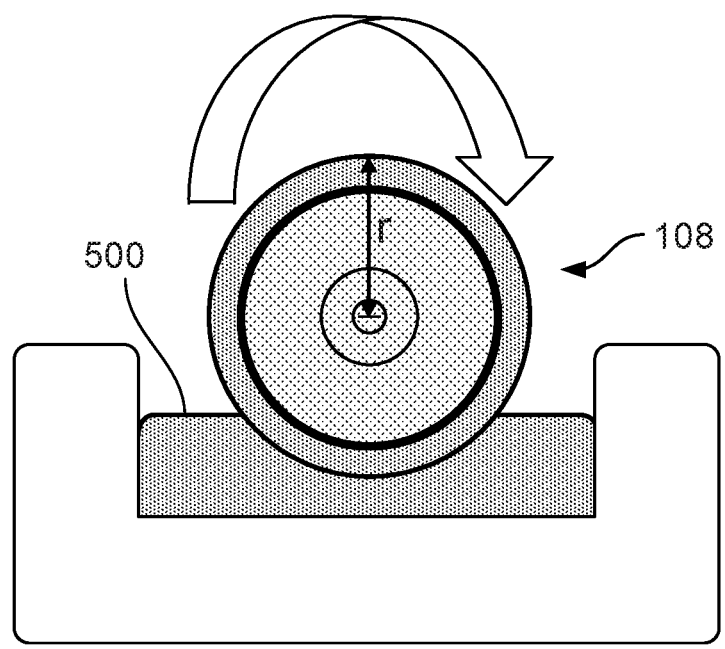

FIG. 4 depicts an example measurement component 106 included in the apparatus 100, according to embodiments of the present disclosure. As shown in this example, and as described above, the measurement component 106 can include a bearing mechanism 400 that includes a bearing 402 and a spring 404. The bearing 402 rotates while in contact with the edge of the eyepiece 102, which itself is rotating with the chuck 104. Movement of the bearing 402 in a transverse direction as indicated by the double-sided arrow (e.g., along a Z-axis that is parallel to the broad surface of the eyepiece) can be used to determine the perimeter measurement data. The measurement component 106 also includes a recording component 406. The recording component 406 generates and stores the perimeter measurement of the perimeter of the eyepiece based on detected movement of the bearing in the transverse direction while the bearing is rotating and in contact with the edge of the eyepiece while the eyepiece is rotating;

FIGS. 5A and 5B depict views of an example sealant applicator 108 included in the apparatus 100, according to embodiments of the present disclosure. The applicator 108, also described as a polymer wheel, can be used to apply the sealant 500 to the edge of the eyepiece 102 while the eyepiece 102 is rotating with the chuck 104, as shown. In some embodiments, a position of the applicator can be adjusted along the transverse direction as indicated by the double-sided arrow to maintain a substantially consistent distance between the applicator 108 and the edge of the eyepiece 102 while the eyepiece 102 is rotating. In some embodiments, this adjustment can be made using previously generated perimeter measurement data for the eyepiece. The radius of the sealant applicator wheel can be selected based on the size and curvature of the eyepiece perimeter where the sealant is to be applied. For example, the wheel radius can be small enough to accommodate the concavity of portions of the edge perimeter, while not being too small such that the polymer sealant is not picked up effectively. In some examples, the wheel radius is between 7 millimeters (mm) and 10 mm.

Figure 6:
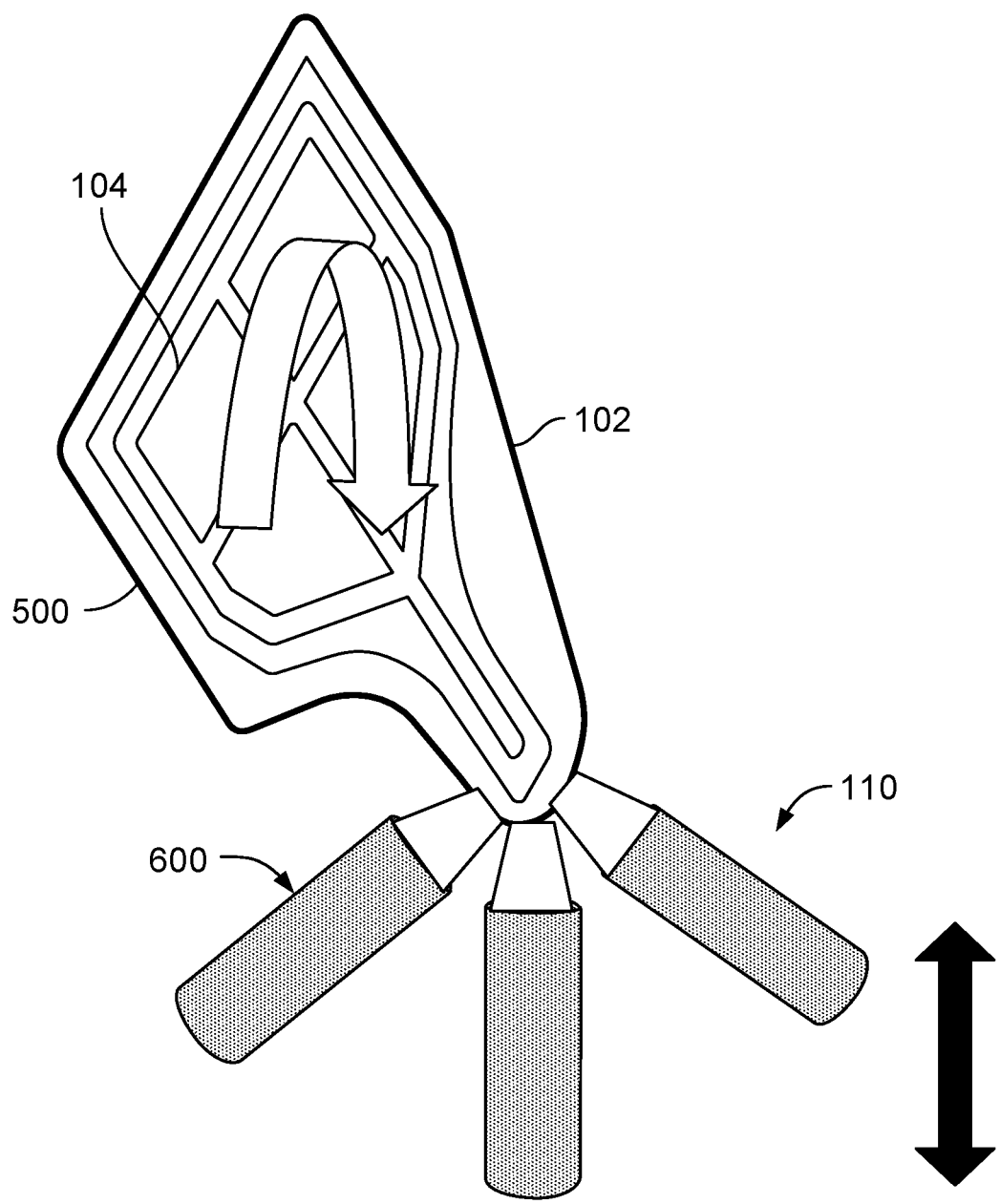
FIGS. 6 and 7 depict an example curing component included in the apparatus, according to embodiments of the present disclosure.
Figure 7:
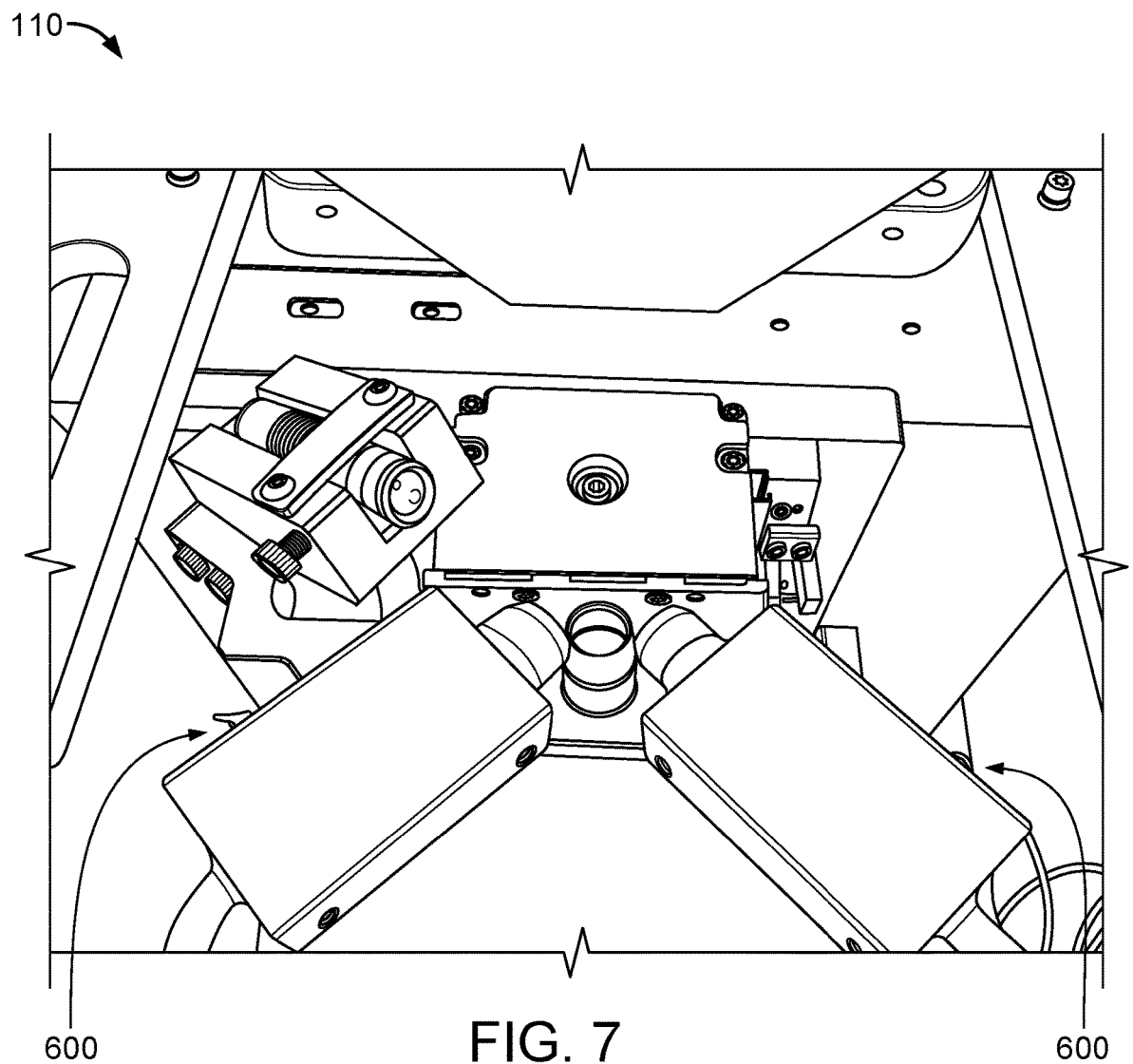

FIGS. 6 and 7 depict an example curing component included in the apparatus, according to embodiments of the present disclosure. As shown in the example of FIG. 6, the curing component 110 can include multiple UV probes 600 that direct UV light toward the sealant 500 while the eyepiece 102 is rotating with the chuck 104. In some embodiments, a position of the component 110 can be adjusted along the transverse direction indicated by the double-sided arrow to maintain a substantially consistent distance between the UV probe(s) 600 and the edge of the eyepiece 102 while the eyepiece 102 is rotating. In some embodiments, this adjustment can be made using previously generated perimeter measurement data for the eyepiece. FIG. 7 shows a top-down view of the curing component 110, within multiple UV probes 600 directing UV light toward an eyepiece location from different directions, to more precisely control the depth of the wicking of the sealant.

FIG. 8 depicts an example QC component 112 included in the apparatus 100, according to embodiments of the present disclosure. In this example, a laser micrometer, including laser micrometer emitter 800 and laser micrometer receiver 802, is used to measure eyepiece thickness before and after application of the sealant 500. A difference in thickness corresponds to the extent to which the sealant 500 encroaches on top of the cover glass of the eyepiece. The wicking length and edge band thickness may be measured using a vision camera instead that is also part of the QC component 112.

Figure 9B:
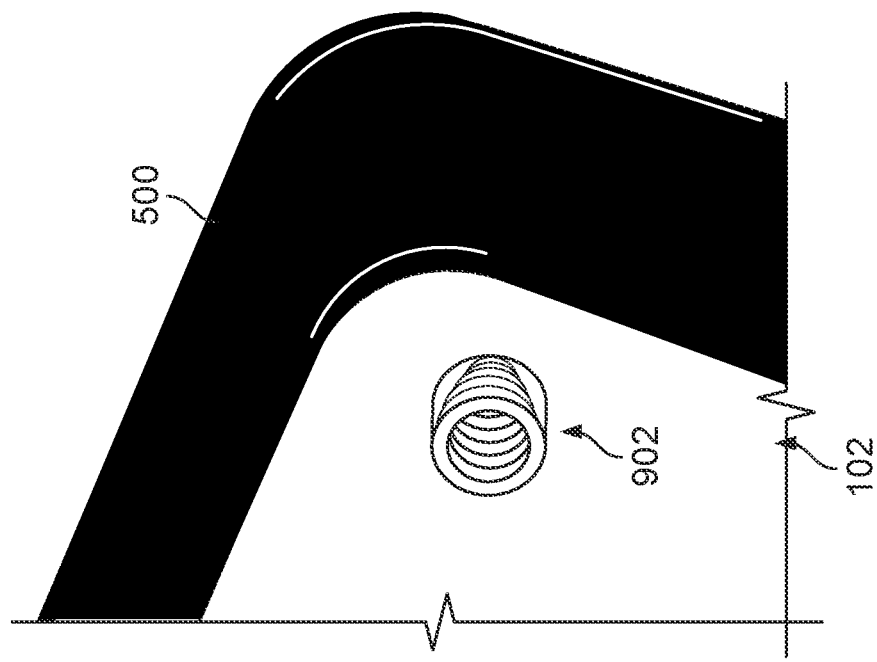
FIGS. 9A and 9B depict a portion of an example eyepiece before and after sealant application, according to embodiments of the present disclosure.
Figure 9A:
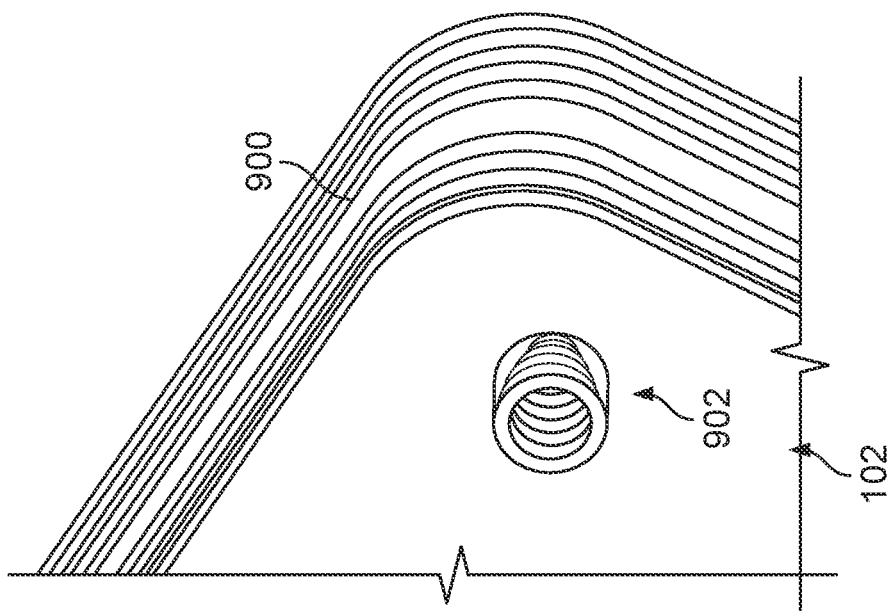

FIGS. 9A and 9B depict a portion of an example eyepiece 102 before (FIG. 9A) and after (FIG. 9B) application of the sealant 500 to edge 900 of the eyepiece 102, according to embodiments of the present disclosure. In this example, lamination adhesive spacers 902 are employed between the layers of the eyepiece 102 to maintain spacing between the layers. Alternatively, a dam can be employed between layers as described below.

Figure 10A:
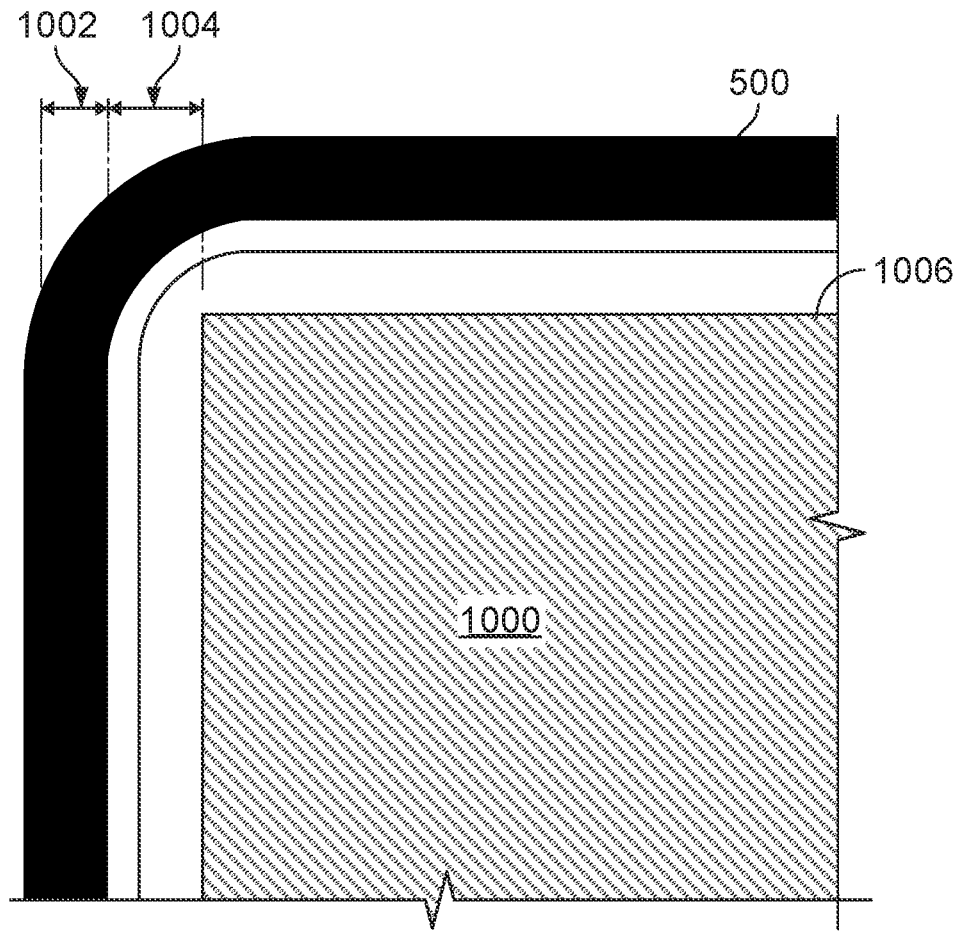
FIG. 10A depicts a portion of an example eyepiece with applied sealant, according to embodiments of the present disclosure.

FIG. 10A depicts a portion of an example eyepiece 102 with applied sealant 500, according to embodiments of the present disclosure. Eyepiece 102 includes grating 1000. A camera may be used to measure edge band thickness 1002 and wicking length 1004 from the border of the edge band to the eyepiece grating boundary 1006. In one example, the edge band thickness is 0.15 mm, and the wicking length is 0.35 mm, with both measurements varying among eyepieces within a suitable variance. In some examples, 1.5 mm is the designed nominal distance from grating boundary 1006 to edge 900 of eyepiece 102. FIG. 10B depicts an example arrangement for imaging the eyepiece, to generate a view such as that shown in FIG. 10A. As depicted, camera 1008 has a telecentric lens 1010. In one example, camera 1008 is a 5M Cognex™ camera. However, other appropriate cameras may be used.

Figure 11:
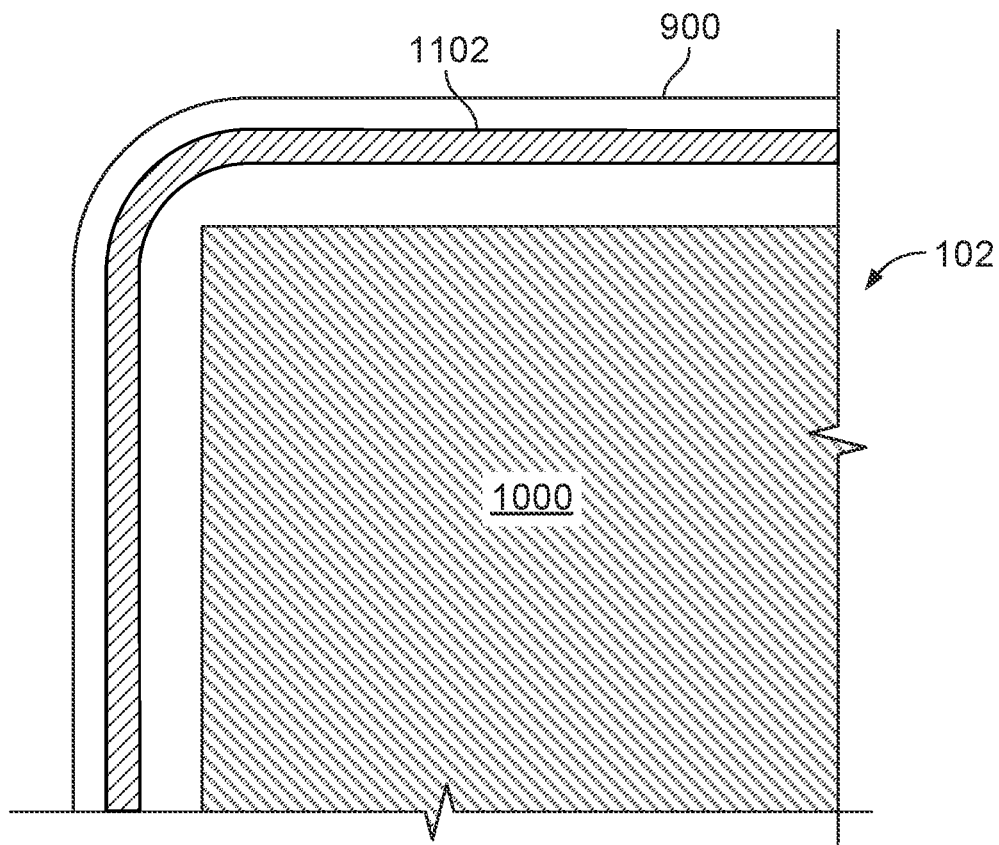
FIG. 11 depicts a portion of an example eyepiece with a wicking dam prior to sealant application, according to embodiments of the present disclosure.

FIG. 11 depicts a portion of an example eyepiece 102 with a wicking dam 1102 proximate edge 900 prior to sealant application, according to embodiments of the present disclosure. In some examples, a wicking dam can be added between layers of the eyepiece during manufacture of the eyepiece, the wicking dam to stop the wicking of the edge sealant beyond a suitable depth in between the layers. The dam can be applied between the layers prior to application of the edge coating. The dam material can be a high viscosity polymer that is clear, and UV-curable. Curing of the dam material can be performed prior to application and curing of the edge sealant. Glass beads can be embedded in the dam material to provide a spacer that separates layers.

Figure 12:
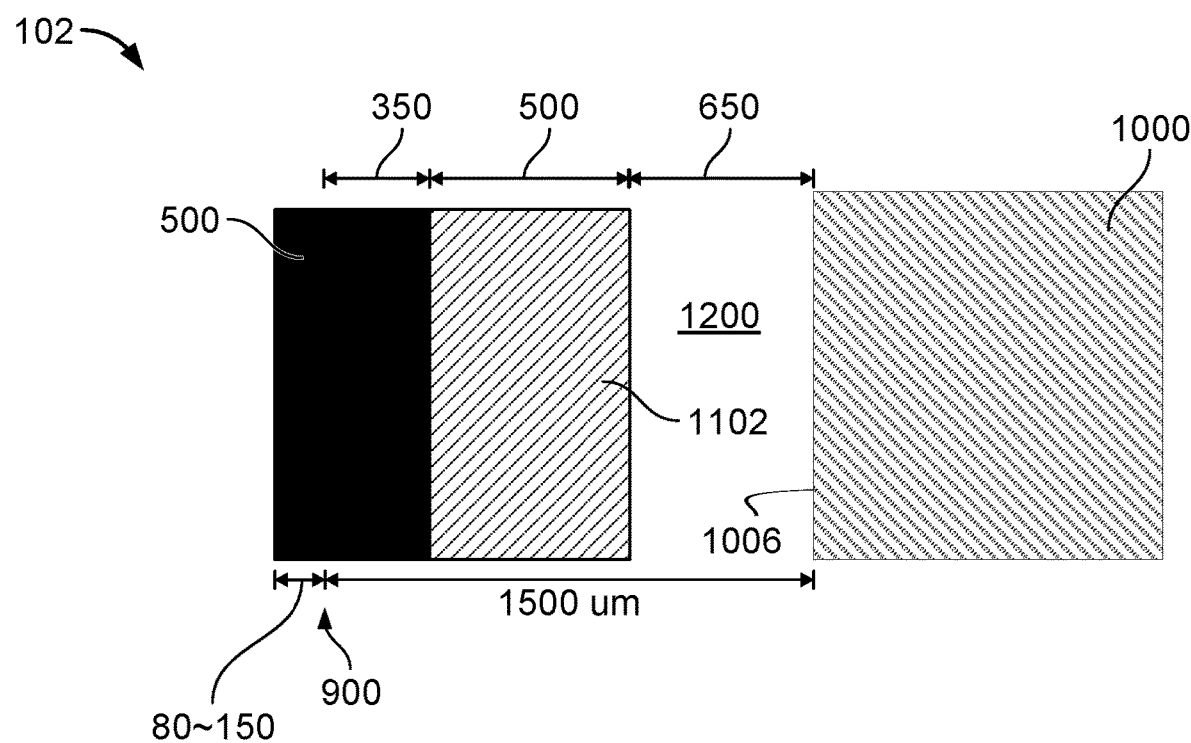
FIG. 12 depicts an example dam arrangement in an eyepiece, according to embodiments of the present disclosure.

FIG. 12 depicts an example dam arrangement in an eyepiece 102, according to embodiments of the present disclosure. The units shown are microns. For example, the thickness of the sealant 500 from the edge 900 of the glass can be 80-150 microns, and the wicking depth of the sealant can be 350 microns until the wicking is halted by the dam 1102. The dam 1102 can be 500 microns wide, and separated from the grating boundary 1006 of the eyepiece by a gap 1200 that is 650 microns wide. The distance between the edge 900 of the glass and the grating boundary 1006 can be 1500 microns (1.5 mm). Other suitable dimensions can also be employed.

Figure 13:
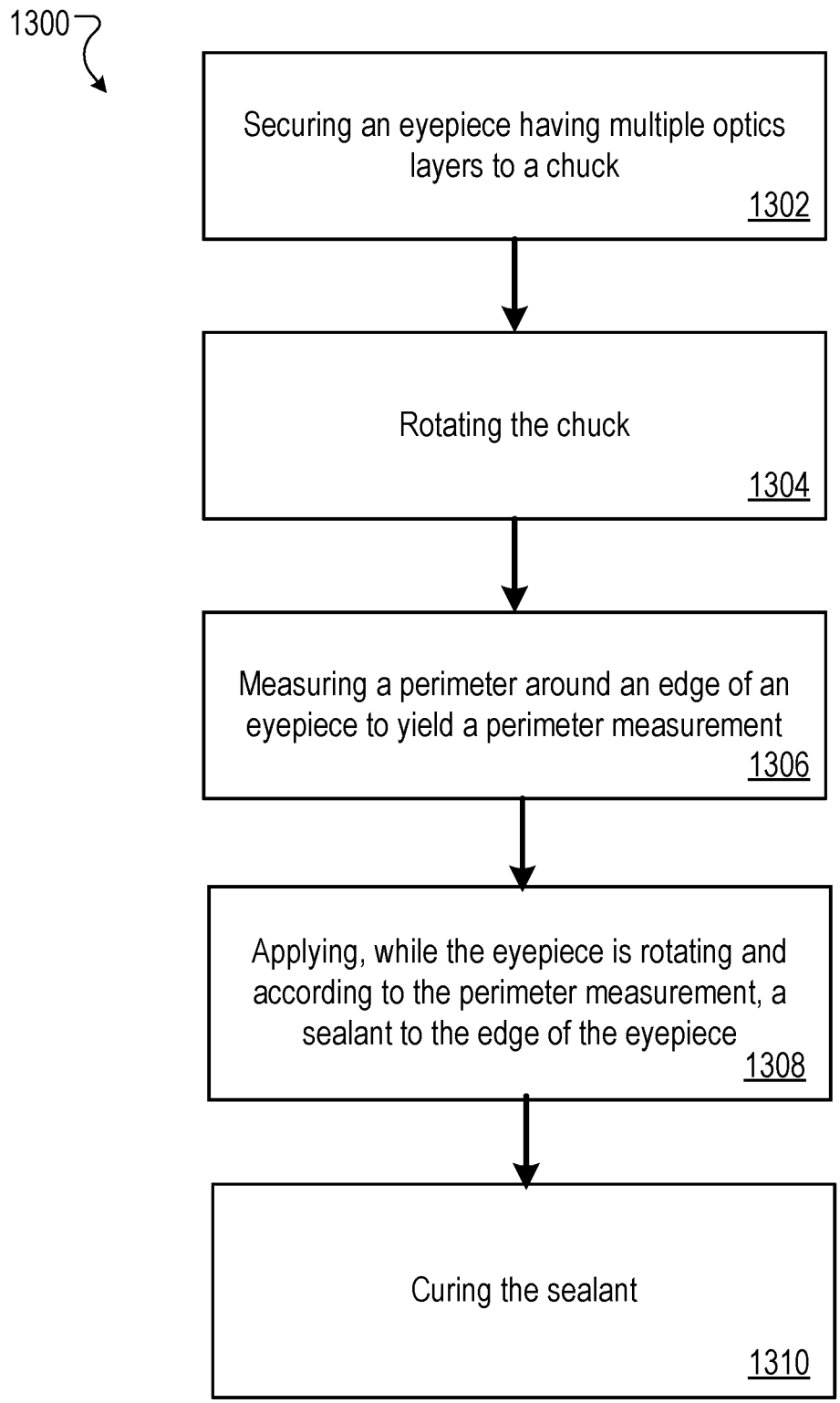
FIG. 13 is a flow chart showing operations in a process for applying edge sealant to an eyepiece.

FIG. 13 shows operations in a process 1300 for applying an edge sealant to an eyepiece. In 3012, an eyepiece having multiple optics layers is secured to a chuck such that a surface of the eyepiece is in contact with the chuck. Securing the eyepiece to the chuck may include applying at least a partial vacuum to the surface of the eyepiece. In 1304, the chuck is rotated, and the eyepiece rotates with the chuck while the chuck rotates. In 1306, a perimeter around an edge of the eyepiece is measured to yield a perimeter measurement. Measuring the perimeter around the edge of the eyepiece may include contacting the edge of the eyepiece with a bearing while the eyepiece is rotating, thereby rotating the bearing. The bearing is coupled to a spring that allows movement of the bearing, while the bearing is contacting the edge of the eyepiece, in a direction substantially parallel to a plane defined by the surface of the eyepiece in contact with the chuck. The perimeter measurement is based at least in part on detected movement of the bearing in the direction substantially parallel to the plane defined by the surface of the eyepiece in contact with the chuck. The perimeter measurement may be stored. In 1308, a sealant is applied to the edge of the eyepiece while the eyepiece is rotating and according to the perimeter measurement. Applying the sealant to the edge of the eyepiece includes applying the sealant to the multiple optics layers. Applying the sealant to the edge of the eyepiece includes applying a single layer of the sealant to the entire perimeter. In 1310, the sealant is cured. Curing the sealant typically includes irradiating the sealant with UV radiation. Irradiating the sealant with UV radiation includes irradiating the sealant with UV radiation directed along or substantially parallel to a plane defined by the edge of the eyepiece, a plane along or substantially parallel to a plane defined by the surface of the eyepiece, or both.

While this specification contains many specific details, these should not be construed as limitations on the scope of the disclosure or of what may be claimed, but rather as examples of features that are associated with particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claims.

What is claimed is:

1. A method of applying an edge sealant to an eyepiece, the method comprising:
    securing the eyepiece comprising multiple optics layers to a chuck such that a surface of the eyepiece is in contact with the chuck;
    rotating the chuck, wherein the eyepiece rotates with the chuck while the chuck rotates;
    measuring a perimeter around an edge of the eyepiece to yield a perimeter measurement, wherein measuring the perimeter comprises contacting the edge of the eyepiece with a bearing while the eyepiece is rotating, thereby rotating the bearing, wherein the bearing moves in a transverse direction while rotating, and the perimeter measurement indicates a displacement of the bearing in the transverse direction while the bearing moves along the perimeter of the eyepiece, the transverse direction being substantially parallel to a broad surface of the eyepiece;
    applying, while the eyepiece is rotating and according to the perimeter measurement, a sealant to the edge of the eyepiece; and
    curing the sealant.

2. The method of claim 1, wherein the bearing is coupled to a spring that allows movement of the bearing.

3. The method of claim 1, further comprising storing the perimeter measurement.

4. The method of claim 1, wherein securing the eyepiece to the chuck comprises applying at least a partial vacuum to the surface of the eyepiece.

5. The method of claim 1, wherein applying the sealant to the edge of the eyepiece comprises applying the sealant to the multiple optics layers.

6. The method of claim 1, wherein applying the sealant to the edge of the eyepiece comprises applying a single layer of the sealant to the entire perimeter.

7. The method of claim 1, wherein curing the sealant comprises irradiating the sealant with UV radiation.

8. The method of claim 7, wherein irradiating the sealant with UV radiation comprises irradiating the sealant with UV radiation directed along or substantially parallel to a plane defined by the edge of the eyepiece, along or substantially parallel to a plane defined by the surface of the eyepiece, or both.

9. The method of claim 1, further comprising applying the sealant with a sealant applicator, and adjusting a position of the sealant applicator to maintain the sealant applicator at a substantially consistent distance in the transverse direction from the edge of the eyepiece according to the perimeter measurement.

10. The method of claim 1, wherein the sealant is cured with a curing component, and further comprising adjusting the curing component to maintain the curing component at a substantially consistent distance in the transverse direction from the edge of the eyepiece according to the perimeter measurement.

* * * * *